US008769678B2

(12) United States Patent
Dubrovsky et al.

(10) Patent No.: US 8,769,678 B2
(45) Date of Patent: Jul. 1, 2014

(54) CLOUD-BASED GATEWAY SECURITY SCANNING

(71) Applicant: SonicWALL, Inc., San Jose, CA (US)

(72) Inventors: Aleksandr Dubrovsky, San Jose, CA (US); Senthilkumar G. Cheetancheri, Fremont, CA (US); Boris Yanovsky, Saratoga, CA (US)

(73) Assignee: SonicWALL, Inc., San Jose, CA (US)

( * ) Notice: Subject to any disclaimer, the term of this patent is extended or adjusted under 35 U.S.C. 154(b) by 0 days.

(21) Appl. No.: 13/626,777

(22) Filed: Sep. 25, 2012

(65) Prior Publication Data

US 2013/0191914 A1    Jul. 25, 2013

Related U.S. Application Data

(63) Continuation of application No. 12/509,955, filed on Jul. 27, 2009, now Pat. No. 8,276,202, which is a continuation of application No. 12/494,726, filed on Jun. 30, 2009, now abandoned.

(51) Int. Cl.
*H04L 29/06* (2006.01)
*G06F 21/00* (2013.01)

(52) U.S. Cl.
USPC ............ 726/22; 709/224; 709/230; 713/168; 380/30

(58) Field of Classification Search
USPC ................. 726/22, 24; 709/224, 230; 380/30; 713/168
See application file for complete search history.

(56) References Cited

U.S. PATENT DOCUMENTS

| 8,276,202 B1 | 9/2012 | Dubrovsky |
| 2006/0224724 A1* | 10/2006 | Marinescu et al. ........... 709/224 |
| 2007/0150948 A1* | 6/2007 | De Spiegeleer ................ 726/22 |
| 2007/0240222 A1* | 10/2007 | Tuvell et al. ................... 726/24 |

FOREIGN PATENT DOCUMENTS

| JP | 2012253506 A | * | 12/2012 |
| WO | WO 2009155574 | | 12/2009 |

OTHER PUBLICATIONS

Roshan Punnoose, Adina Crainiceanu, David Rapp; "Rya: a scalable RDF triple store for the clouds"; Aug. 2012; Cloud-I '12: Proceedings of the 1st International Workshop on Cloud Intelligence; Publisher: ACM; pp. 1-8.*
Kumar, P.; Nitin; Sehgal, V.; Shah, K.; Shukla, S.S.P.; Chauhan, D.S.; "A novel approach for security in Cloud Computing using Hidden Markov Model and clustering", Information and Communication Technologies (WICT), 2011 World Congress on Digital Object Indentifier: 10.1109/WICT.2011.6141351; Publication Year: Aug. 2011, pp. 810-815.
U.S. Appl. No. 12/509,955; Office Action mailed Dec. 6, 2011.

* cited by examiner

*Primary Examiner* — Hadi Armouche
*Assistant Examiner* — Courtney Fields
(74) *Attorney, Agent, or Firm* — Lewis Roca Rothgerber LLP

(57) ABSTRACT

Some embodiments of cloud-based gateway security scanning have been presented. In one embodiment, some data packets are received sequentially at a gateway device. The data packets constitute at least a part of a file being addressed to a client machine coupled to the gateway device. The gateway device forwards an identification of the file to a remote datacenter in parallel with forwarding the data packets to the client machine. The datacenter performs signature matching on the identification and returns a result of the signature matching to the gateway device. The gateway device determining whether to block the file from the client machine based on the result of the signature matching from the data-center.

13 Claims, 6 Drawing Sheets

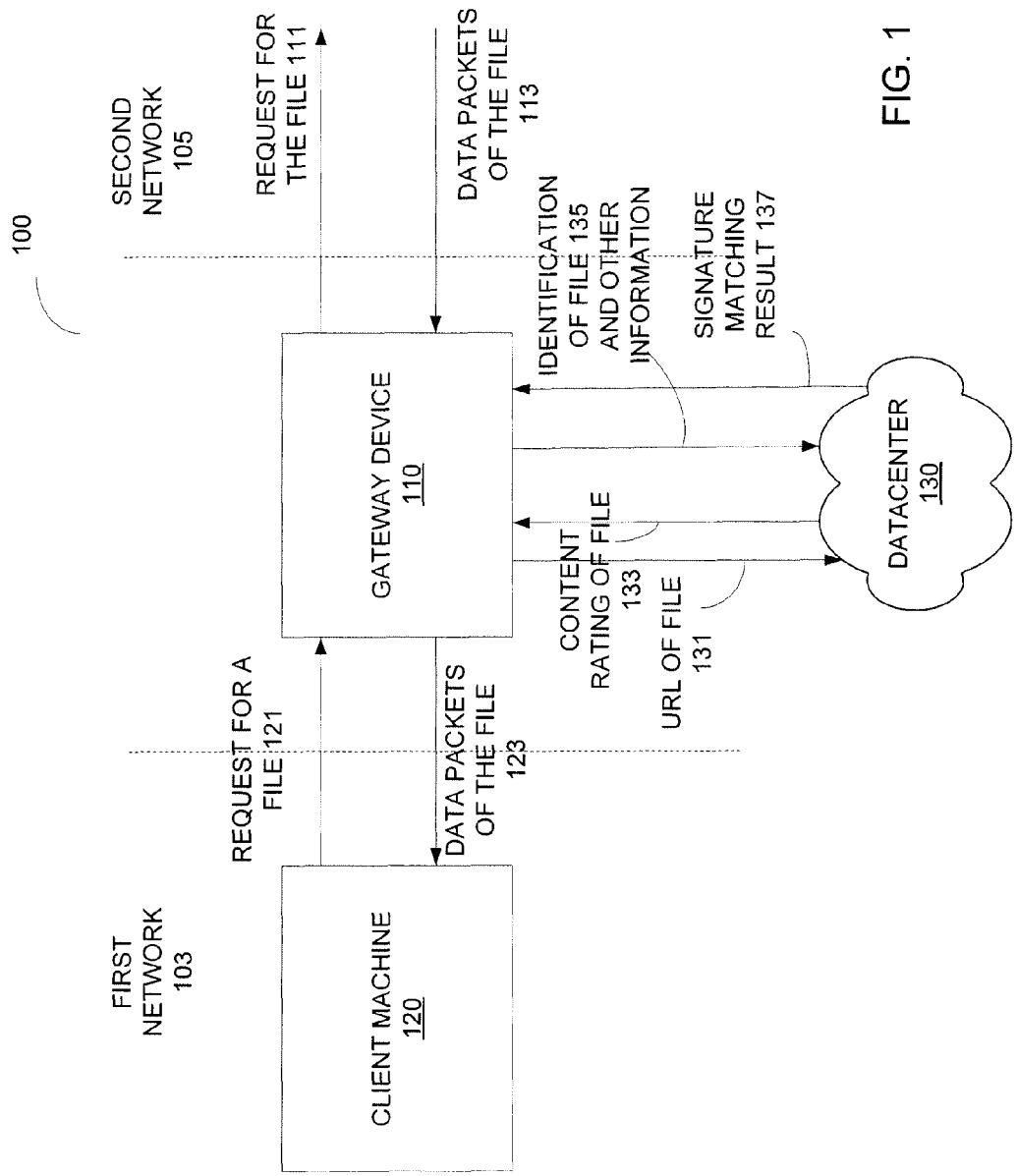

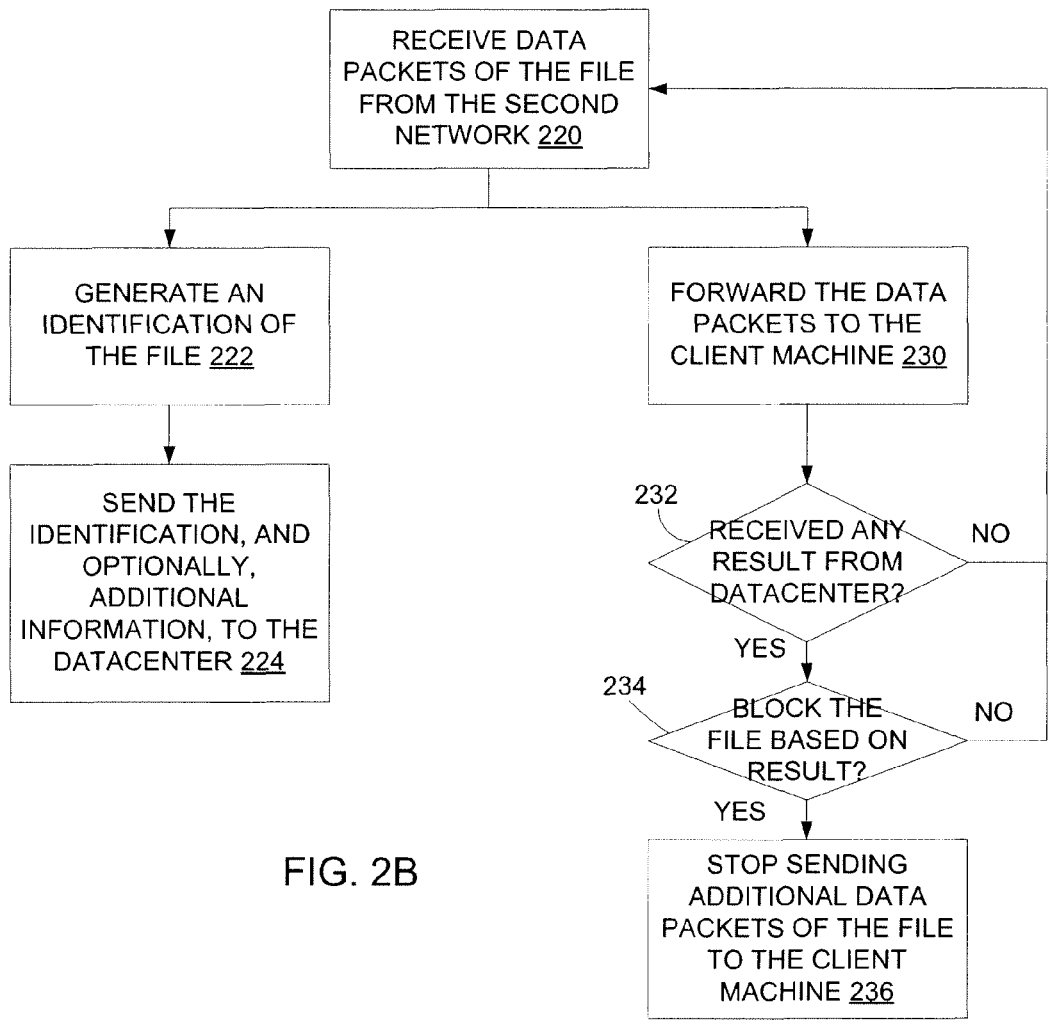

CLOUD-BASED GATEWAY SECURITY SCANNING

CROSS-REFERENCE TO RELATED APPLICATION

The present application is a continuation and claims the priority benefit of U.S. patent application Ser. No. 12/509,955 filed Jul. 27, 2009, now U.S. Pat. No. 8,276,202, which is a continuation and claims the priority benefit of U.S. patent application Ser. No. 12/494,726 filed Jun. 30, 2009, the disclosures of which are incorporated herein by reference.

BACKGROUND OF THE INVENTION

1. Field of the Invention

The present invention relates to intrusion detection and prevention in a networked system, and more particularly, to providing cloud-based gateway security scanning.

2. Background

Conventionally, intrusion prevention as well as content filtering are important protection needed by numerous entities, ranging from private companies to governmental agencies. To protect an entity's networked system, some form of intrusion prevention system is usually implemented. A common intrusion prevention system is a firewall setup in between the entity's networked system and external network. The firewall can screen incoming data to detect possible malware (e.g., virus, spyware, etc.) and block the incoming data if possible malware is detected. As used herein, malware broadly refers to malicious software designed to infiltrate and/or damage a computer system and/or network without the informed consent, or even knowledge, of owner of the computer system and/or network.

In addition to screening data for malware, the firewall is often used to screen the content of incoming data for content filtering purpose. If the incoming data falls into a prohibited category according to the entity's policy (e.g., pornography, violence, social networking sites, etc.), then the firewall may block the incoming data as well.

In order to detect malware and to determine the content rating of incoming traffic, the firewall typically stores signatures of known malware and content ratings of known webpages. However, only a limited number of these signatures and content ratings may be limited because of the limited storage capacity of the firewall. As a result, the coverage of these signatures and content ratings stored in the firewall is also limited. Furthermore, in systems having multiple firewalls, updating the signatures and content ratings across a system can be tedious and time consuming because each of the firewalls in the system has to be updated to ensure consistency.

BRIEF DESCRIPTION OF THE DRAWINGS

FIG. 1 illustrates one embodiment of a networked system.

FIG. 2A illustrates one embodiment of a method to process a file request at a gateway device.

FIG. 2B illustrates one embodiment of a method to perform cloud-based gateway anti-virus scanning.

DETAILED DESCRIPTION

Figure 3A:
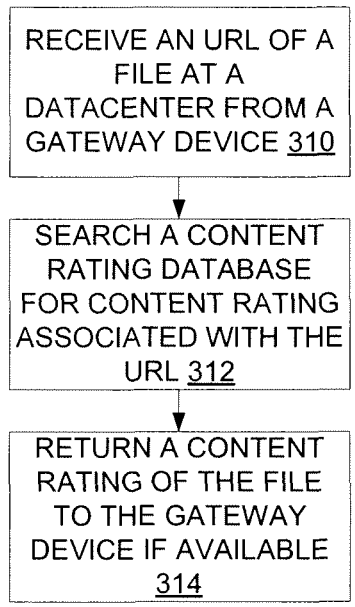
FIG. 3A illustrates one embodiment of a method to determine content rating of a file at a datacenter.

Described herein are some embodiments of cloud-based gateway anti-virus scanning. In one embodiment, some data packets are received sequentially at a gateway device. The data packets constitute at least part of a file being addressed to a client machine coupled to the gateway device. The gateway device forwards an identification of the file to a remote datacenter in parallel with forwarding the data packets to the client machine. The datacenter may have stored a set of signatures of previously identified malware. Furthermore, these signatures may be updated every now and then to ensure newly found malware is covered. The datacenter performs signature matching on the identification and returns a result of the signature matching to the gateway device. Then the gateway device determines whether to block the file from the client machine based on the result of the signature matching from the datacenter. In some embodiments, a match indicates that the incoming file is likely to contain malware, whereas no match indicates that the incoming file is not likely to contain malware. If the gateway device determines to block the file, the gateway device may simply stop forwarding the data packets not yet forwarded to the client device and discard these data packets. The gateway device may further send a message or a warning to the client machine to notify the client machine of its finding.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a networked system. The system 100 includes a gateway device 110 coupled between a first network 103 and a second network 105. In some embodiments, the first network 103 is a private network (e.g., a local area network (LAN) of a company), whereas the second network 105 includes a public network (e.g., the Internet). The gateway device 110 is further coupled to a datacenter 130, which may be within either the first network 103, the second network 105, or a third network. The datacenter 130 includes at least one computing machine and at least one computer-readable storage medium. The datacenter 130 may also be referred to as a cloud. In general, the computing machine of the datacenter 130 is operable to perform security screening related tasks, such as looking up content rating of webpages, evaluating and determining content rating of webpages, performing signature matching (such as pattern matching, hash comparison, etc.), etc. The computer-readable storage medium of the datacenter 130 may store security screening related information, such as content ratings of webpages and their associated path (e.g., Universal Resource Locator (URL)), patterns or signatures of malware (e.g., virus, spyware, etc.). The computer-readable storage medium may include one or more databases made of various media, such as ROM, CDs, magnetic tapes, optical drives, etc. In some embodiments, the security screening related information may be updated periodically to include updated content ratings of existing webpages, content ratings of new webpages, signatures of newly identified malware, etc. Such update may be performed manually by an administrator of the datacenter, or automatically by downloading from another server of a network security company that provides such updates.

There is at least one client machine 120 in the first network 103. Note that the first network 103 may include additional client machines. The client machine 120 includes a computing device with network accessing capability, such as a personal computer, a server, a cellular telephone, a laptop computer, a personal digital assistant (PDA), a smartphone, etc. To illustrate the operations in the system 100, one example is discussed in details below.

In some embodiments, the client machine 120 sends a request 121 for a file to the gateway device 110. For instance, a user of the client machine 120 may have clicked on a hyperlink in a webpage to request certain content, such as another webpage, a document, a song, a video, a picture, an executable of a software application, etc. The gateway device 110 forwards the request 111 for the file to the second network 105. Substantial simultaneously, the gateway device 110 may also forward the path 131 of the file (e.g., the URL of the file) to the datacenter 130. Using the path 131 of the file, the datacenter 130 looks up the content rating of the file from its computer-readable storage medium. If the datacenter 130 successfully finds the content rating of the file, then the datacenter 130 sends the content rating 133 to the gateway device 110. Based on the content rating 133, the gateway device 110 may decide whether to block the file from the client machine 110. For example, if the content rating 133 indicates that the file is in a prohibited category (e.g., pornographic, violent, etc.) according to a predetermined policy of the first network 103, then the gateway device 110 may block the file. For example, the gateway device 110 may simply discard data packets of the file instead of forwarding the data packets to the client machine 120.

In response to the request 111 for the file, a host or a server in the second network 105 may send data packets 113 of the file to the gateway device 110. The gateway device 110 may forward the data packets 123 to the client machine 120 as the data packets are received at the gateway device, provided the gateway device 110 has not received the content rating of the file from the datacenter 130 yet or the gateway device 110 has determined that the content rating of the file is not in a prohibited category. Typically, in some embodiments, if the datacenter 130 can successfully find the content rating of the file, the datacenter 130 can send the content rating 133 to the gateway device 110 before all data packets of the file are received at the gateway device.

Furthermore, as the gateway device 110 receives the data packets 113 from the second network 105, the gateway device 110 may generate an identification of the file based on the partial information of the file provided by the data packets 113 received. In some embodiments, the gateway device 110 computes a partial hash from the data packets 113 received and uses the partial hash as an identification of the file. The gateway device 110 then sends the identification 135 of the file to the datacenter 130. In some embodiments, the gateway device 110 may send additional information with the identification of the file 135 to the datacenter 130. Such information may include URL of the file, destination server Internet Protocol (IP) address, hostname, etc. In some embodiments, the gateway device 110 may send identifications of some predetermined types of files to the datacenter 130 in order to improve efficiency of the screening process. For instance, the gateway device 110 may send only identifications of executables of software applications to the datacenter 130 for security screening because malware are most likely found in executables.

Using the identification 135 from the gateway device 110, the datacenter 130 determines if there is a high likelihood that the file contains malware. In some embodiments, the datacenter 130 performs signature matching (e.g., pattern matching, hash comparison, etc.) on the identification 135. The datacenter 130 may store a set of signatures previously identified to be signatures of files that contain malware. The datacenter 130 may perform reassemble-free deep packet inspection on the identification 135 to determine if the identification 135 matches any of the signatures stored. The datacenter 130 returns the result 137 of the signature matching to the gateway device 110. Because part of the security screening tasks is performed by the datacenter 130, which is commonly referred to as a cloud, the security screening may also be referred to as cloud-based gateway security screening or cloud-based gateway anti-virus screening.

If the result 137 from the datacenter 130 indicates that there is a match, then the gateway device 110 determines that the file is likely to contain malware and thus, blocks the file from the client machine 120. For instance, the gateway device 110 may simply discard the data packets not yet forwarded to the client machine 120, instead of continuing to forward the data packets to the client machine 120. The gateway device 110 may also send a message or a warning to the client machine 120 to inform the client machine 120 of the decision. Otherwise, if there is no match, then the file is not likely to contain malware, and thus, the gateway device 110 continues to forward data packets of the file to the client machine 120 until all data packets of the file have been forwarded.

FIG. 2A illustrates one embodiment of a method to process a file request at a gateway device. The method may be performed by processing logic that may comprise hardware (e.g., circuitry, dedicated logic, programmable logic, processing cores, etc.), software (such as instructions run on a processing core), firmware, or a combination thereof.

Initially, processing logic of a gateway device receives a request for a file from a client machine (processing block 110). Then processing logic of the gateway device sends a path of the file, such as an URL, to a datacenter to request content rating of the file, if available (processing block 212). Substantially simultaneously, processing logic forwards the request for the file to a second network, such as the Internet, to retrieve the file (processing block 214).

FIG. 2B illustrates one embodiment of a method to perform cloud-based gateway anti-virus scanning. The method may be performed by processing logic that may comprise hardware (e.g., circuitry, dedicated logic, programmable logic, processing cores, etc.), software (such as instructions run on a processing core), firmware, or a combination thereof.

Processing logic of the gateway device receives data packets of the file requested (processing block 220). The data packets received so far may constitute part of the file or the entire file. Processing logic generates an identification of the file using information from the data packets received (processing block 222). Then processing logic sends the identification, and optionally, additional information, to the datacenter (processing block 224). The additional information may include URL of the file, destination server Internet Protocol (IP) address, hostname, etc. The datacenter may perform signature matching on the identification using signatures of previously identified malware.

As processing logic generates the identification, processing logic also forwards the data packets received to the client machine (processing block 230). Then processing logic determines if it has received any result from the datacenter (processing block 232). If not yet, then processing logic returns to processing block 230 to continue forwarding data packets received to the client machine. Otherwise, if processing logic receives the result from the datacenter, the processing logic determines if the file should be blocked based on the result (processing block 234). If the result indicates there is no match, then the file is not likely to contain malware, and thus, processing logic returns to processing block 230 to continue forwarding data packets received to the client machine. Otherwise, if the result indicates that there is a match between the identification of the file and a predetermined malware signature, then the file is likely to contain malware, and thus, processing logic blocks the file from the client machine by stopping transmission of additional data packets of the file to the client machine (processing block 236). The gateway device may further send a message or a warning about this file to the client machine.

FIG. 3A illustrates one embodiment of a method to determine content rating of a file at a datacenter. The method may be performed by processing logic that may comprise hardware (e.g., circuitry, dedicated logic, programmable logic, processing cores, etc.), software (such as instructions run on a processing core), firmware, or a combination thereof.

Processing logic of a datacenter receives a path of a file, such as an URL, from a gateway device (processing block 310). Then processing logic searches a content rating database of the datacenter for a content rating associated with the URL (processing block 312). Processing logic sends the content rating associated with the URL to the gateway device, if available (processing block 314).

Figure 3B:
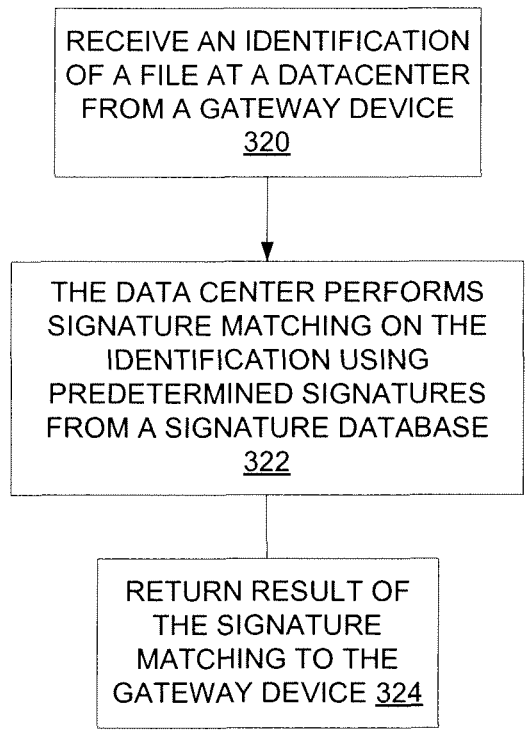
FIG. 3B illustrates one embodiment of a method to screen for virus at a datacenter.

FIG. 3B illustrates one embodiment of a method to screen for virus at a datacenter. The method may be performed by processing logic that may comprise hardware (e.g., circuitry, dedicated logic, programmable logic, processing cores, etc.), software (such as instructions run on a processing core), firmware, or a combination thereof.

Processing logic of the datacenter receives an identification of a file from the gateway device (processing block 320). The identification may be generated from data packets of the entire file, or from a subset of data packets of the file. In some embodiments, the identification is generated by computing a partial hash of a subset of data packets of the file. Then processing logic of the datacenter performs signature matching (e.g., pattern matching, hash comparison, etc.) on the identification using predetermined signatures of malware from a signature database of the datacenter (processing block 322). Finally, processing logic returns result of the signature matching to the gateway device (processing block 324). The gateway device may decide whether to block the file or not based on the result of the signature matching from the datacenter as discussed above.

Figure 4:
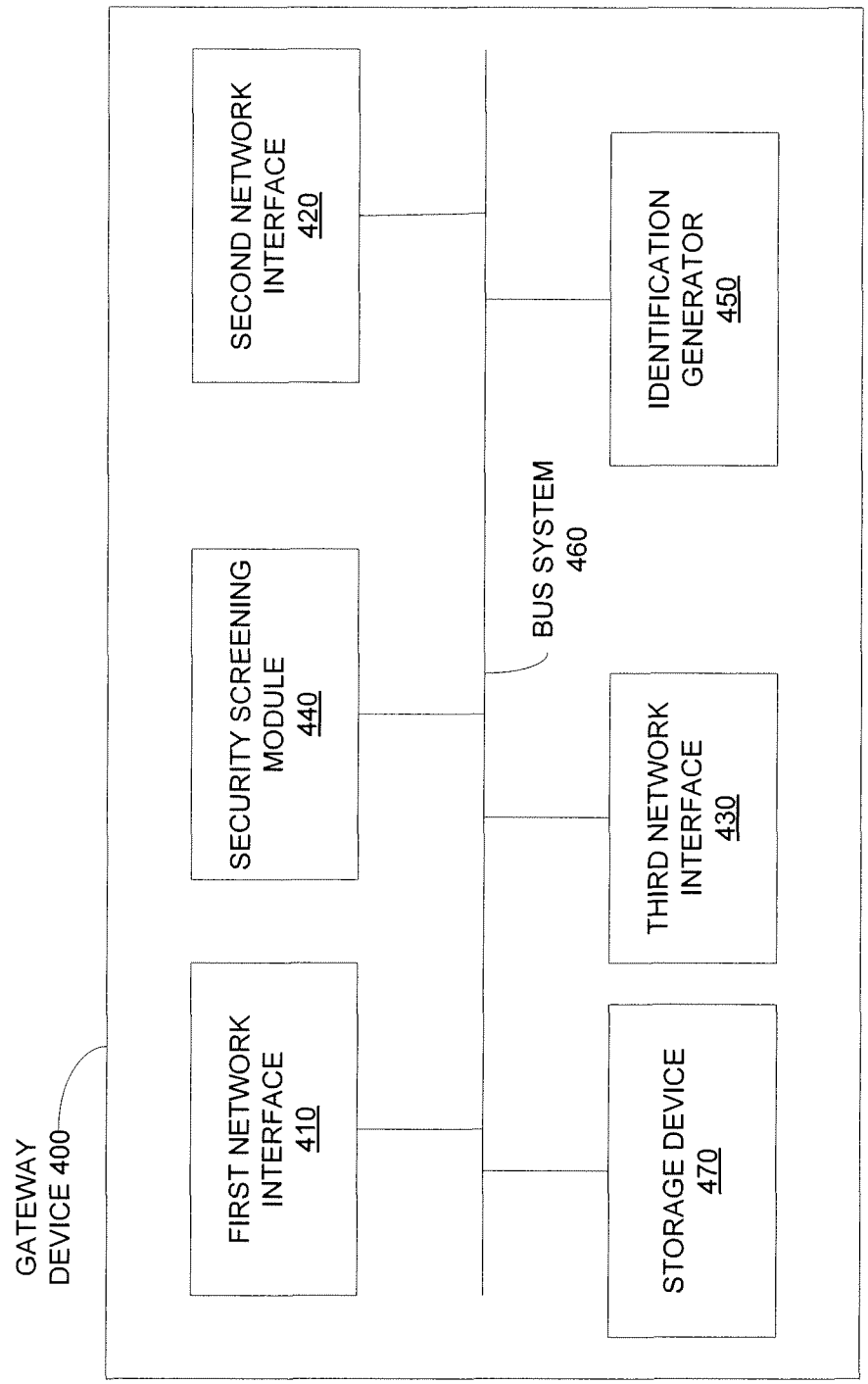
FIG. 4 illustrates one embodiment of a gateway device.

FIG. 4 illustrates one embodiment of a gateway device. The gateway device 400 includes a first network interface 410, a second network interface 420, a third network interface 430, a security screening module 440, a storage device 470, and an identification generator 450, coupled to each other via a bus system 460.

In some embodiments, the first network interface 410 couples to a private network and the client machines therein. For instance, the private network may include a LAN of an entity (e.g., a company, a government, etc.). The second network interface 420 couples to a public network, which may include the Internet. The third network interface 430 couples to a datacenter, such as the one illustrated in FIG. 5.

In some embodiments, the storage device 470 stores content ratings of a number of webpages and/or a number of predetermined signatures of previously identified malware. These webpages may be frequently requested by client machines in the private network, and hence, storing their content ratings locally in the gateway device 400 may speed up security screening. Likewise, the signatures stored in the storage device 470 may be associated with malwares that frequently appear in data directed to the private network. Therefore, storing these signatures locally also speeds up security screening.

The gateway device 400 further includes a security screening module 440. The security screening module 440 may be operable to perform various security screening operations on data passing through the first network interface 410 into the private network. For example, the security screening module 440 may perform content rating evaluation of webpages retrieved, signature matching between the incoming data and predetermined signatures or patterns, etc. In addition, the security screening module 440 may use information (e.g., content ratings of webpages, signature matching results, etc.) from the remote datacenter to determine if an incoming file should be blocked from the client machines in the private network. Details of some embodiments of the interaction between the datacenter and the gateway device 400 have been discussed above.

In some embodiments, the identification generator 450 is operable to generate an identification of a file using some or all of the data packets of the file at the gateway device 400. In other words, the data packets used may or may not constitute the entire file. For example, the identification generator 450 may compute a partial hash of the data packets of a file received so far and use the partial hash as the identification of the file. The identification generated may be forwarded via the third network interface 430 to the datacenter for signature matching or may be forwarded to the security screening module 440 for signature matching locally. If there is a match between the identification and a predetermined malware signature, then the security screening module 440 can signal the first network interface 410 to stop forwarding data packets of the file to the private network. Otherwise, the first network interface 410 may continue forwarding data packets of the file to the private network.

Figure 5:
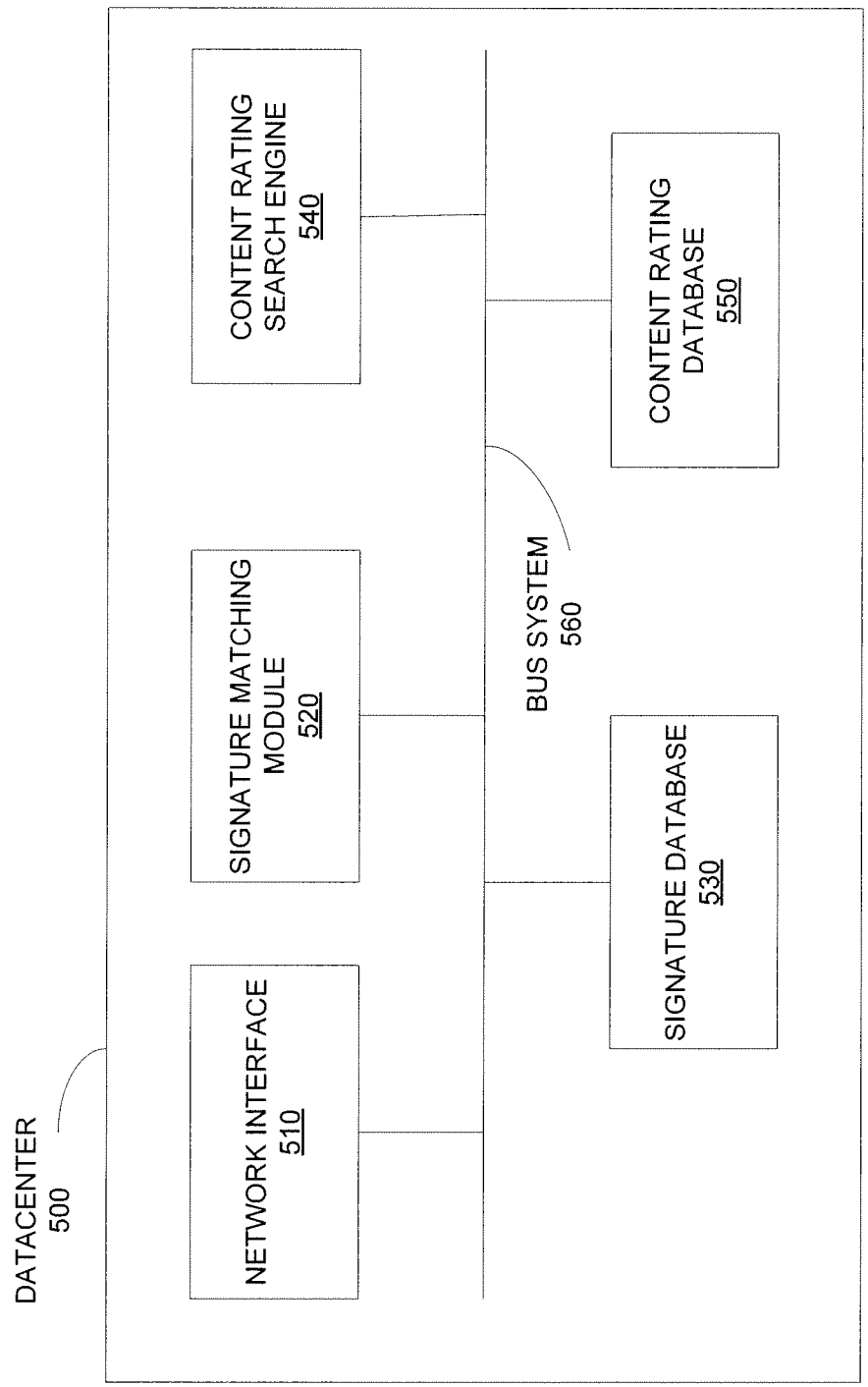
FIG. 5 illustrates one embodiment of a datacenter.

FIG. 5 illustrates one embodiment of a datacenter. The datacenter 500 includes a network interface 510, a signature matching module 520, a signature database 530, a content rating search engine 540, and a content rating database 550, coupled to each other via a bus system 560. In some embodiments, the network interface 510 couples to a gateway device, such as the one illustrated in FIG. 4. The network interface 510 may receive various security screening related information from the gateway device, such as an URL of a file, an identification of a file, etc. Using such information, the datacenter 500 may perform some of the security screening tasks for the gateway device. In other words, the gateway device offloads part of the security screening workload to the datacenter 500, and thus, is able to leverage the additional storage capacity and processing power of the datacenter 500 to track additional content ratings, malware signatures, etc.

In some embodiments, the signature matching module 520 performs signature matching on file identification received from the client machine. The signature matching module 520 retrieves predetermined malware signatures from the signature database 530, and compares the malware signatures against the signature received by pattern matching, hash comparison, etc. In some embodiments, the signature matching module 520 performs deep packet inspection (DPI) on the signature in the comparison. For instance, the signature matching module 520 may use Deterministic Finite Automaton (DFA) or any suitable state machine to perform DPI. Other signature matching algorithms may be used in different embodiments.

In addition to signature matching, the datacenter 500 may perform content rating look-up using the content rating search engine 540 and the content rating database 550. In some embodiments, the client machine may send a path of the file requested to the datacenter 500. Using the path of the file, the content rating search engine 540 searches for the content rating associated with the path in the content rating database 550. If the content rating is found, the datacenter 500 returns the content rating via the network interface 510 to the client machine.

Note that the signature database 530 and the content rating database 550 may be updated, either manually or automatically by downloading updates from a security service provider. For example, content ratings of new webpages, updated content rating of existing webpages, signatures of newly found malware, updated signatures of previously found malware, etc., may be input to the content rating database 550 and the signature database 530, respectively, from time to time (e.g., once a week, once a month, etc.) or at a on-demand basis (e.g., at the request of a system administrator).

Figure 6:
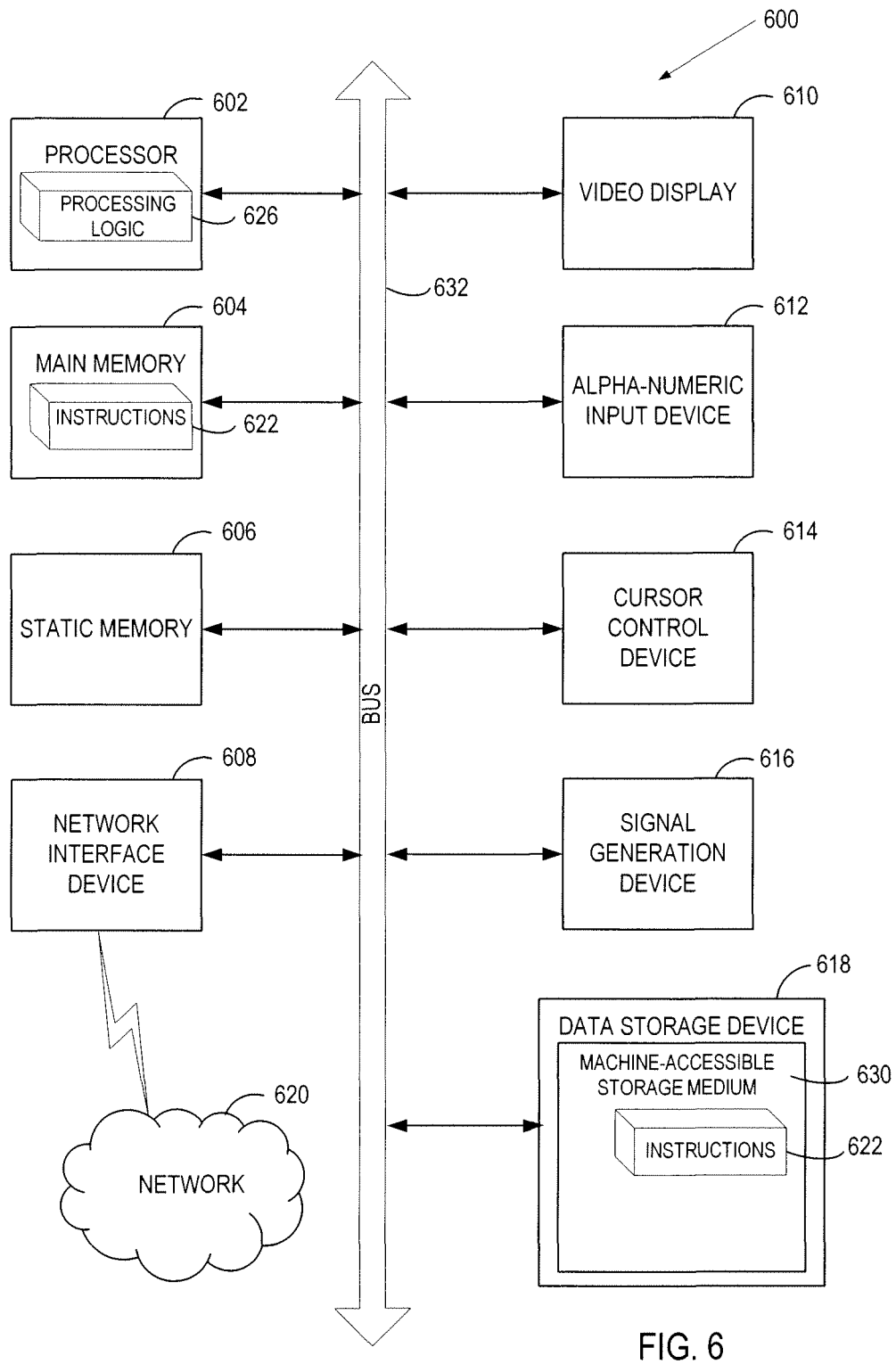
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 518 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. In some embodiments, machine-accessible storage medium may also be referred to as computer-readable storage medium.

Thus, some embodiments of cloud-based gateway security scanning have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for providing cloud-based security scanning, the method comprising:
    storing a plurality of signatures of previously received files in memory of a datacenter, each signature based on at least a partial hash of less than all data packets of an associated previously received file, wherein the associated file is associated with a content rating indicative of a category of content;
    receiving an identification of less than all data packets of a file sent by one or more gateways over a communication network to the datacenter, the identification based on at least a partial hash of the packets comprising less than all data packets of the file before all data packets of the file are received;
    executing instructions stored in memory of the datacenter, wherein execution of the instructions by a processor of the datacenter determines that the identification matches a signature associated with one of the previously received files; and
    sending information over the communication network to the gateway regarding the file associated with the matching signature, the information including the associated content rating, wherein the gateway blocks the file based on the associated content rating indicating a prohibited category of content before all data packets of the file are received.

2. The method of claim 1, wherein the stored signatures comprise signatures of known malware files.

3. The method of claim 1, wherein the stored signatures comprise signatures of known webpages.

4. The method of claim 1, wherein the received identification identifies a type of the file, and wherein the identification is forwarded based on the identified type.

5. The method of claim 1, further comprising receiving at least one of a destination server Internet Protocol (IP) address, a hostname, and a Universal Resource Locator (URL) of the file with the identification at the datacenter.

6. A system for providing cloud-based security scanning, the system comprising:
    one or more gateways; and
    a datacenter comprising:
        memory for storing a plurality of signatures of previously received files in memory of a datacenter, each signature based on at least a partial hash of less than all data packets of an associated previously received file, wherein the associated file is associated with a content rating indicative of a category of content,
        a communication interface for receiving an identification of less than all data packets of a file sent by one of the gateways over a communication network to the datacenter, the identification based on at least a partial hash of the packets comprising less than all data packets of the file before all data packets of the file are received, and
        a processor for executing instructions stored in memory of the datacenter, wherein execution of the instructions by the processor determines that the identification matches a signature associated with one of the previously received files, wherein information is sent over the communication network to the gateway regarding the file associated with the matching signature, the information including the associated content rating, and
    wherein the gateway blocks the file based on the associated content rating indicating a prohibited category of content before all data packets of the file are received.

7. The system of claim 6, wherein the stored signatures comprise signatures of known malware files.

8. The system of claim 6, wherein the stored signatures comprise signatures of known webpages.

9. The system of claim 6, wherein the received identification identifies a type of the file, and wherein the identification is forwarded based on the identified type.

10. The system of claim 6, further comprising receiving at least one of a destination server Internet Protocol (IP) address, a hostname, and a Universal Resource Locator (URL) of the file with the identification at the datacenter.

11. The system of claim 6, further comprising a client device, wherein the gateway transmits the file to the client device when a content rating indicates that an associated file is not from a prohibited category of content.

12. The system of claim 6, wherein the datacenter is remote to the gateway device.

13. A non-transitory computer-readable storage medium having embodied thereon a program executable by a processor for performing a method for providing cloud-based security scanning, the method comprising:
    storing a plurality of signatures of previously received files, each signature based on at least a partial hash of less than all data packets of an associated previously received file, wherein the associated file is associated with a content rating indicative of a category of content;
    receiving an identification of less than all data packets of a file, the identification based on at least a partial hash of the packets comprising less than all data packets of the file before all data packets of the file are received;
    determining that the identification matches a signature associated with one of the previously received files; and
    sending information a gateway regarding the file associated with the matching signature, the information including the associated content rating, wherein the gateway blocks the file based on the associated content rating indicating a prohibited category of content before all data packets of the file are received.

* * * * *